Sept. 30, 1952             T. W. HORN            2,612,249
CONSTANT SPEED DRIVE FOR AUTOMOBILE
GENERATORS AND THE LIKE
Filed June 14, 1948                         2 SHEETS—SHEET 1
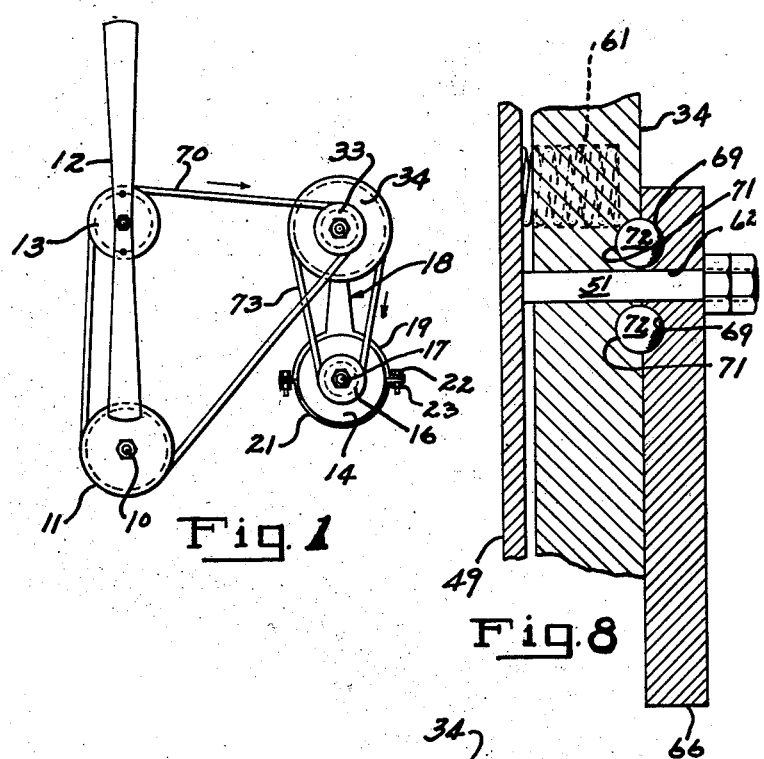
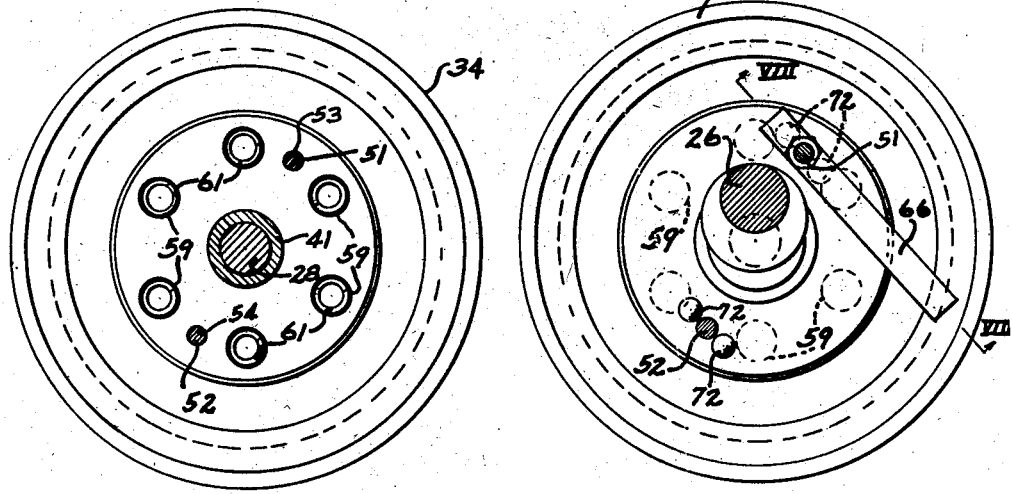
Inventor
THURMAN W. HORN
By Jennings & Carter
Attorneys

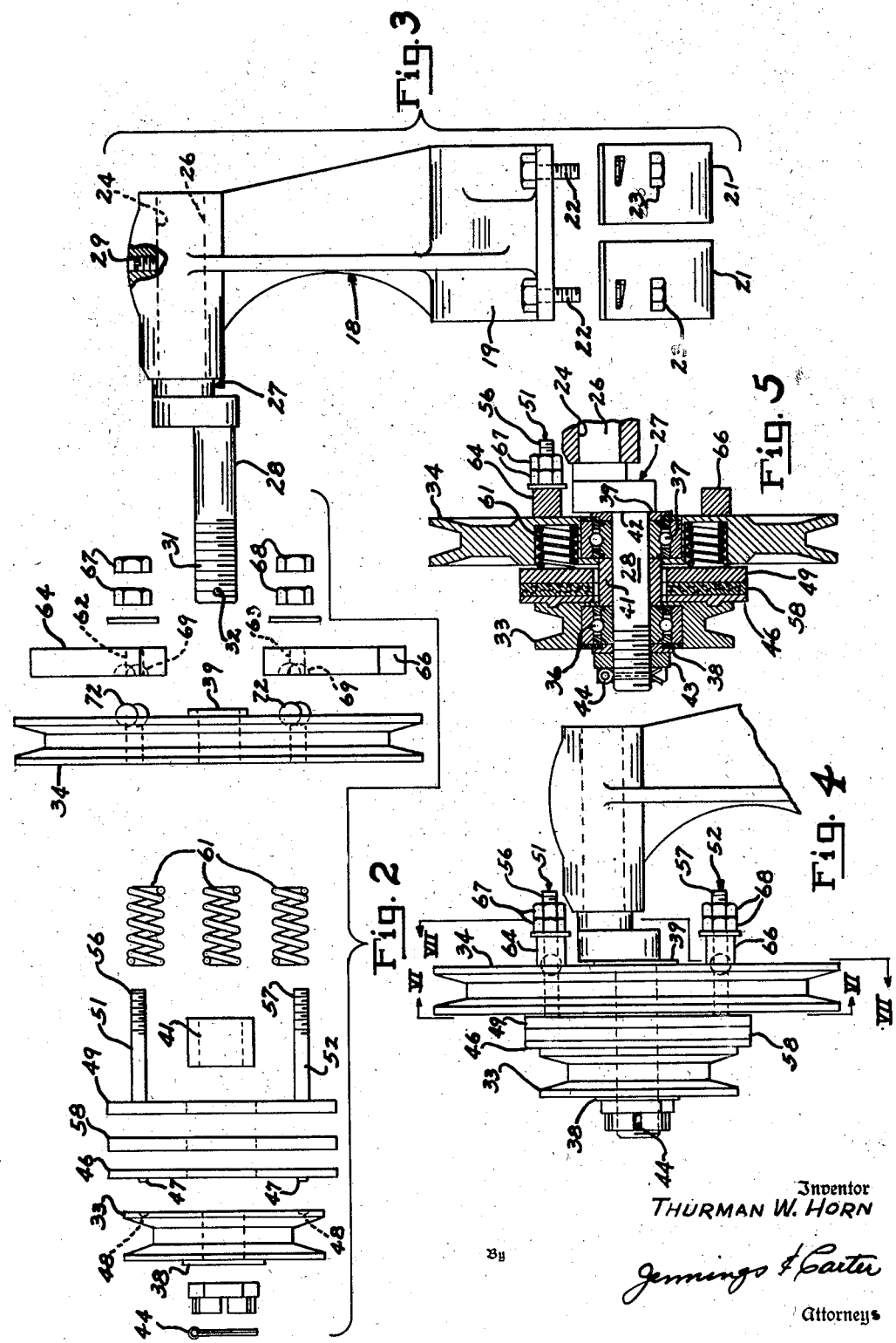

Patented Sept. 30, 1952

2,612,249

UNITED STATES PATENT OFFICE 2,612,249

CONSTANT SPEED DRIVE FOR AUTOMOBILE GENERATORS AND THE LIKE

Thurman W. Horn, Anniston, Ala., assignor to Cabometer, Inc., a corporation of Alabama Application June 14, 1948, Serial No. 32,764

4 Claims. (Cl. 192—104)

My present invention relates to apparatus for driving the generators of automobiles and the like at a substantial constant speed, whereby the generator delivers substantially its maximum current throughout the entire speed range of the automobile engine, thus to permit the operation of high load electrical devices such as radios and the like from the battery of the automobile.

It is an object of my invention to provide apparatus of the character designated in which the generator is driven from the engine through a friction clutch having associated therewith springs and centrifugally actuated release devices, cooperating to maintain the speed of the generator substantially constant, regardless of the speed of the engine.

Another object is to provide a friction drive of the character designated in which heat generated by the slippage between the elements thereof is effectively dissipated by the construction and arrangement of the parts of the device, and by locating the apparatus in the air stream of the usual cooling fan for the engine.

Further objects are to provide a device of the character designated which shall be simple of construction and may be installed on existing automobiles without changing the engine or generator; in which the friction elements have long trouble free life; which shall be free of objectionable noises when in operation; and which in operation in no way changes or disturbs the normal functioning of the generator current control devices usually associated with automotive generator systems.

In the art to which my invention relates, it has heretofore been proposed to drive a generator through an over drive mechanism, thereby to increase the speed and hence the output of the generator when the engine is idling. All such mechanisms with which I am familiar have been equipped with means to completely disengage the generator from the engine when the latter attains a predetermined speed. In prior apparatus, therefore, the generator has been rotated either at a given relatively high speed or has been disengaged from the engine. My apparatus differs from that heretofore proposed in that it permits the generator to be driven at a constant speed regardless of the engine speed.

Apparatus illustrating the features of my invention is shown in the accompanying drawings, forming a part of this application, in which:

Fig. 1 is a somewhat diagrammatic front elevational view showing my improved device in place on a generator and driven from the crank shaft of the engine;

Fig. 2 is an exploded view of the pulley and clutch portions of my improved apparatus;

Fig. 3 is an exploded view of the supporting bracket and spindle on which the parts shown in Fig. 2 are mounted and supported;

Fig. 4 is a side elevational view of the assembled device, a portion of the bracket being broken away;

Fig. 5 is a detail sectional view partly broken away showing the device assembled;

Fig. 6 is a detail sectional view taken along line VI—VI of Fig. 4;

Fig. 7 is a detail sectional view taken along line VII—VII of Fig. 4; and,

Fig. 8 is a detail sectional view drawn to an enlarged scale and taken along line VIII—VIII of Fig. 7.

Referring now to the drawings for a better understanding of my invention and more particularly to Fig. 1 thereof, I illustrate my improved apparatus in association with the crank shaft 10 of an engine, not shown, and having a pulley 11 thereon. Disposed above the pulley 11 is the usual fan 12 for delivering cooling air to the engine, and carrying a pulley 13. To one side of the crank shaft 10, and mounted on the engine in any suitable manner, is a generator 14 having a pulley 16 on the end of the armature shaft 17.

Mounted on top of the generator 14 is a pedestal 18. The pedestal has a semicircular lower end 19 for fitting about the body of the generator, and is held thereto by means of semicircular clamps 21, bolts 22, and nuts 23 therefor.

The pedestal is provided at its upper end with a bore 24. Disposed to fit slidably and rotatably in the bore 24 is the rear end 26 of a mounting shaft 27. The forward portion 28 of the shaft 27 is eccentrically offset with respect to the rear end 26, and forms a spindle for supporting the rotating parts of my improved apparatus as will be presently described. The end 26 is held non-rotatably within the bore by means of a set screw 29. The forward end of the spindle 28 is threaded as indicated at 31, and is provided with a small cross opening 32.

Mounted on the spindle 28 in side by side relation and for independent rotation relative to each other, are pulleys 33 and 34, provided with ball bearings 36 and 37, respectively. The pulleys are held in axially spaced relation by means of flanged collars 38 and 39 and by an intermediate sleeve 41. The collars and sleeve engage the ends of the inner races of the ball bearings 36 and 37, collar 39 abutting against the shoulder 42 forming the point of connection between the portions 26 and 28 of the shaft 27. A castellated nut 43, screwed onto the threaded end 31 engages the face of the collar 38, thus to hold the parts on the shaft. The nut may be locked by means of the usual cotter pin 44 passing through the nut and the opening 32 in the end of the spindle 28. The pulleys 33 and 34 thus are mounted on the spindle 28 for rotation relative to each other, and are held fixedly in axially spaced relation.

The clutch mechanism for coupling the pulleys 33 and 34 together to effect constant speed rotation of the pulley 34 will now be described. Adjacent the inner face of the pulley 33 is a disc 46, preferably formed of a material having a hardness of the order of iron, although it may be formed of other material. The disc 46 carries on its side adjacent the pulley 33 a pair of protuberances 47 disposed to fit in sockets 48 formed in the side of the pulley 33, to hold the pulley and plate 46 against relative rotation.

Disposed adjacent the face of the pulley 34 is a disc 49 which may be formed of material similar to the disc 46. The disc 49 carries a pair of rearwardly extending pins 51 and 52, which project slidably through openings 53 and 54 in the pulley 34. The projecting ends of the pins are threaded as indicated at 56 and 57. Interposed between the discs 46 and 49 is a disc of friction material 58, such for instance as asbestos, woven belting or the like.

The inner face of the pulley 34 is provided with a plurality of recesses 59 forming sockets for receiving a plurality of compression springs 61. The opposite ends of the springs 61 bear against the rear face of the disc 49 and bias the same toward the disc of friction material 58, thus forming a clutch to frictionally lock the pulleys 33 and 34 together. It is to be noted that I provide a number of springs 61, whereby the engaging pressure of the disc 49 toward the disc 58 is applied evenly over the entire area of the disc, thus preventing spot wear of the discs.

The projecting ends of the pins 51 and 52 pass loosely through openings 62 and 63 provided in the ends of a pair of elongated weights 64 and 66. The weights are pivotally mounted on the pins 51 and 52, and are held in place thereon by means of jam nuts 67 and 68. On the face of each weight adjacent the pulley 34 I provide a pair of hemispherical sockets 69. The sockets are disposed on either side of the openings 62 and 63 through which pass the pins 51 and 52. On the adjacent face of the pulley 34 I provide similar hemispherical sockets 71, likewise located on either side of the openings in the pulley through which pass the pins 51 and 52. Disposed in the sockets are steel balls 72. The balls and sockets thus provide cam means for effecting rearward movement of the disc 49, against the force of the springs 61, whenever the weights 64 and 66 pivot about the pins, in the manner to be described.

The driving arrangement for transmitting rotary motion from the crankshaft 10 to the armature shaft 17 is completed by the provision of belts 70 and 73 passing respectively over the pulleys 11, 13 and 33, and the pulleys 16 and 34.

From the foregoing the method of constructing and operating my improved apparatus may now be readily understood. As is known, automobile generators usually are connected directly to the engine by a belt passing over pulley 11, pulley 13, and pulley 16 carried on the armature shaft 17. In those instances wherein the automobile is driven for a majority of the time at idling speeds, it is found that the battery generally becomes exhausted of current because the generator does not produce sufficient amperage at idling speed of the engine to maintain the battery charged. With my improved apparatus assembled and installed in the manner shown and described, the pulley 33 is driven through the belt 70 at a rate of speed dependent solely upon the ratio of the diameter of the pulleys 11 and 33. By suitably adjusting the nuts 67 and 68 on the pins 51 and 52, the force of springs 61 urging the discs of the clutch together may be determined. The engaging pressure of the clutch elements may thus be regulated by a simple adjustment of the nuts, and when thus adjusted pulley 33 drives pulley 34, through the clutch. When the speed of pulley 34 exceeds the speed at which the nuts 67 and 68 are set to permit slippage of the clutch, the free end of the weights 64 and 66 move outwardly due to centrifugal force. This action causes the weights to ride upwardly on the balls 72, pulling the pins 51 and 52 farther through the pulley 34, and hence moving disc 49 slightly away from the friction disc 58, against the force of springs 61. This permits the pulley 33 to slip with respect to the pulley 34, thereby maintaining the speed of the pulley 34 at a predetermined rate. I have found that the centrifugally actuated weights tend to remain in such a position that the pulley 34 is driven at a constant speed throughout the range of speed of the engine above the range predetermined by the setting of the nuts 67 and 68.

In view of the fact that generators usually installed on automobiles generate their maximum current at a speed considerably higher than engine idling speed, I preferably make the pulley 34 of larger diameter than the pulley 33, thereby to obtain an overdrive of the generator at idling speed of the engine. Likewise, I preferably make the pulleys 33 and 34 of a material having a high rate of heat dissipation, such for instance as aluminum, in order to assure long life for the discs 46, 49 and 58. As before stated, I preferably mount the pulleys so that they receive cooling air from the fan 12, thus further aiding in preventing overheating of the device. By loosening set screw 29, the shaft 27 may be rotated thereby to tighten the belts 70 and 73.

From the foregoing, it will be apparent that I have devised an improved apparatus for driving a generator from the engine of an automobile or the like, which is simple of operation and in which the generator is driven at a substantially constant speed, throughout all ranges of speed of the engine from idling to full throttle position. In actual operation, I have found that a device constructed in accordance with my invention is satisfactory in every way and that the same is particularly useful for installation on automobiles wherein increased charging capacity for the battery is needed, such for instance, as in those cases wherein the automobile is equipped with radio. I have found that the disc of friction material has unusually long life, and it will be obvious from the drawings that the same may be replaced without undue difficulty, and without removing the device from the generator. It is to be especially noted that at no time is the generator entirely disconnected from the engine, but that on the other hand the same operates within a range of speed as determined by a single adjustment of the nuts 67 and 68.

While I have shown my invention in but one form, it will be obvious to those skilled in the art that it is not so limited, but is susceptible of various changes and modifications without departing from the spirit thereof and I desire, therefore, that only such limitations shall be placed thereupon as are specifically set forth in the appended claims.

What I claim is:

1. In apparatus for driving a generator or the like from an engine, a pair of pulleys mounted side by side on a common stationary shaft for rotation relative to each other, means holding the pulleys fixed against movement toward and from each other, a belt passing over one of said pulleys and driven by the engine, a second belt passing over the other pulley and driving the generator, a friction clutch interposed between the pulleys, there being a plurality of recesses in the side of the pulley driving the generator adjacent said friction clutch, compression springs in said depressions biasing said friction clutch toward a position to lock said pulleys together, a pair of axially movable pins carried by one element of the clutch and limiting the clutch engaging pressure exerted by the springs, and centrifugally actuated members carried by the pins and movable to a position to decrease the clutch engaging pressure when the speed of said pulleys reaches a predetermined value.

2. Apparatus as defined in claim 1 in which the centrifugally actuated members comprise a pair of elongated weights, each of said pins passing through one of the pulleys and through one end of said weights, and in which the ends of the pins carry nuts for regulating the clutch engaging pressure exerted by the compression springs.

3. In apparatus for coupling a generator and the like in driving relation to an engine, a stationary shaft, a pair of pulleys mounted side by side in fixed axial relation on the shaft for independent rotation, belt drives connecting one pulley to the engine and the other to the generator, a metal disc nonrotatably secured to the face of the pulley driven from the engine, a second metal disc adjacent the face of the other pulley, a disc of friction material between said metal discs, springs interposed between the second disc and its associated pulley and pressing the discs into frictional engagement, pins secured to the face of the second disc adjacent said other pulley and extending slidably therethrough, threaded sections on the outer ends of the pins, elongated weights disposed on the face of said other pulley opposite the second disc, said pins passing loosely through one end of each weight, adjusting nuts on the threaded ends of the pins for drawing the second disc toward said other pulley against the force of the springs, and steel balls disposed in sockets in the adjacent faces of the weights and said other pulley and disposed upon rotation of the weights to draw the pins through said other pulley against the force of the springs.

4. In apparatus for driving a generator and the like from an engine embodying a pulley driven from the engine and a pulley mounted alongside the first pulley and operatively connected to drive the generator, the improvements comprising a stationary shaft on which the pulleys are mounted for rotation and in axially fixed position relative to each other, a pair of clutch discs fitting about the shaft between the pulleys and slidable axially on the shaft, a disc of friction material surrounding the shaft and interposed between the clutch discs, a pair of axially disposed pins carried by the clutch disc adjacent the generator driving pulley and projecting slidably through openings in said generator driving pulley there being a plurality of recesses in the side of said generator driving pulley facing the adjacent clutch disc, a plurality of compression springs in said recesses bearing against the adjacent clutch disc, threaded sections on the projecting ends of said pins, eccentrically mounted weights loosely surrounding the projecting ends of said pins, nuts on the threaded ends of the pins holding said weights assembled thereon, and cam means between the nuts and the adjacent face of the generator driving pulley effective when the weights rotate on the pins to move the pins and hence the clutch disc carried thereby toward the generator driving pulley.

THURMAN W. HORN.

REFERENCES CITED

The following references are of record in the file of this patent:

UNITED STATES PATENTS

| Number | Name | Date |
| --- | --- | --- |
| 453,033 | Blount | May 26, 1891 |
| 456,392 | Ballard | July 21, 1891 |
| 462,028 | Ballard | Oct. 27, 1891 |
| 659,194 | Baynes | Oct. 2, 1900 |
| 1,167,850 | Smith | Jan. 11, 1916 |
| 1,198,633 | Heins | Sept. 19, 1916 |
| 1,284,192 | Harris | Nov. 15, 1918 |
| 1,555,370 | Heidegger | Sept. 29, 1925 |
| 1,670,877 | Bruckmann | May 22, 1928 |
| 2,079,724 | Van Ranst | May 11, 1937 |
| 2,122,218 | Sneed | June 28, 1938 |
| 2,376,939 | Ricart | May 29, 1945 |
| 2,432,591 | Schuckers | Dec. 16, 1947 |

FOREIGN PATENTS

| Number | Country | Date |
| --- | --- | --- |
| 497,611 | France | Dec. 11, 1919 |
| 551,985 | Great Britain | Mar. 18, 1943 |
| 64,333 | Denmark | Feb. 25, 1946 |